US012591661B2

(12) United States Patent
Gazit et al.

(10) Patent No.: US 12,591,661 B2
(45) Date of Patent: Mar. 31, 2026

(54) CONTAINER MODE MANAGEMENT ENGINE IN A SECURITY MANAGEMENT SYSTEM

(71) Applicant: Microsoft Technology Licensing, LLC, Redmond, WA (US)

(72) Inventors: Jonathan Gazit, Tel Aviv (IL); Dotan Patrich, Kfar Saba (IL); Idan Gutman, Givatayim (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 18/460,362

(22) Filed: Sep. 1, 2023

(65) Prior Publication Data

US 2025/0077645 A1     Mar. 6, 2025

(51) Int. Cl.
*G06F 21/53*          (2013.01)

(52) U.S. Cl.
CPC .................................... *G06F 21/53* (2013.01)

(58) Field of Classification Search
CPC ...................................................... G06F 21/53
See application file for complete search history.

(56) References Cited

U.S. PATENT DOCUMENTS 11,586,589 B2     2/2023   Scrivano et al.
2006/0212945 A1*  9/2006   Donlin .................... G06F 21/53
                                                          726/29

(Continued)

FOREIGN PATENT DOCUMENTS

CN          113886004  A      1/2022
CN          114329443  A      4/2022
KR          20220163608  A     12/2022

OTHER PUBLICATIONS

"Drop privileges after startup or start as unprivileged user?", Retrieved from: https://security.stackexchange.com/questions/151688/ drop-privileges-after-startup-or-start-as-unprivileged-user, Retrieved Date: Apr. 30, 2023, 3 Pages.

(Continued)

*Primary Examiner* — Beemnet W Dada
(74) *Attorney, Agent, or Firm* — Shook, Hardy & Bacon L.L.P.

(57)          ABSTRACT

Methods, systems, and computer storage media for providing container secure computing modes using a container mode management engine of a security management system. A container secure computing mode can include a secure state in which a container operates to prioritize security measures and practices. A container secure computing mode can be assigned to a container instance and enforced via a container security agent. In operation, a container instance is initialized, the container instance is associated with a container security agent having a secure compute mode transition control for the container instance. Based on the secure compute mode transition control, the container instance is transitioned into a secure state. A container operation of the container instance is accessed. The execution of the container operation is restricted based on the secure state of the container instance. The secure state is associated with a secure state configuration that supports restricting the container operation.

20 Claims, 11 Drawing Sheets

(56)      References Cited

U.S. PATENT DOCUMENTS

| | | | |
|---|---|---|---|
| 2015/0052616 A1* | 2/2015 | Hutchison | G06F 3/0632 |
| | | | 726/27 |
| 2020/0137091 A1* | 4/2020 | Nadgowda | H04L 63/1425 |
| 2021/0232693 A1* | 7/2021 | Leenstra | G06F 21/74 |
| 2024/0143708 A1* | 5/2024 | Khatri | G06F 21/31 |

OTHER PUBLICATIONS

"Open Shift Guide", Retrieved from: https://www.redhat.com/rhdc/managed-files/cl-openshift-security-guide-ebook-us287757-202103.pdf, Retrieved Date: Jun. 16, 2023, 299 Pages.

"Privilege revocation (computing)", Retrieved from: https://en.wikipedia.org/wiki/Privilege_revocation_(computing), May 14, 2019, 1 Page.

"Understanding AppArmor", Retrieved from: https://gitlab.com/apparmor/apparmor/-/wikis/FAQ#controlling-apparmor, Retrieved Date: Apr. 30, 2023, 5 Pages.

International Search Report and Written Opinion received for PCT Application No. PCT/US2024/039967, mailed on Jul. 30, 2025, 13 pages.

* cited by examiner

SECURITY MANAGEMENT SYSTEM
100A

CONTAINER MODE MANAGEMENT ENGINE
110

CONTAINER MODE MANAGEMENT ENGINE OPERATIONS
112

SECURE COMPUTE MODE TRANSITION CONTROL DATA
114

SECURE STATE DATA
116

SECURE COMPUTE MODE TRANSITION CONTROL MACHINE LEARNING ENGINE
140

CONTAINER MANAGER
110A

CONTAINER OPERATING ENVIRONMENT
120

CONTAINER SECURITY AGENT
122

CONTAINER INSTANCE
124

NETWORK
100B

SECURITY MANAGEMENT CLIENT
130

CONTAINER MODE MANAGEMENT ENGINE CLIENT
132

CONTAINER SECURITY INTERFACE DATA
134

FIG. 1A

SECURITY MANAGEMENT SYSTEM 100A

CONTAINER MODE MANAGEMENT ENGINE 110

SECURE COMPUTE MODE TRANSITION CONTROL MACHINE LEARNING ENGINE 140

MACHINE LEARNING ENGINE DATA 142

CONTAINER INSTANCE DATA 144

CONTAINER OPERATIONS DATA 146

MACHINE-LEARNING PRE-OPERATION PHASE MODEL 148

CONTAINER MODE MANAGEMENT ENGINE OPERATIONS 112

SECURE STATE DATA 116

HIGH-RESTRICTION STATE 116A

POLICY-BASED-RESTRICTION STATE 116B

SECURE COMPUTE MODE TRANSITION CONTROL DATA 114

TIME-BASED CONTROL 114A

REPORT-BASED CONTROL 114B

MACHINE-LEARNING-BASED CONTROL 114C

CONTAINER MANAGER 110A

CONTAINER OPERATING ENVIRONMENT 120

CONTAINER SECURITY AGENT 122

CONTAINER INSTANCE 124

SECURITY MANAGEMENT CLIENT 130

CONTAINER MODE MANAGEMENT ENGINE CLIENT 132

CONTAINER SECURITY INTERFACE DATA 134

FIG. 2A

300

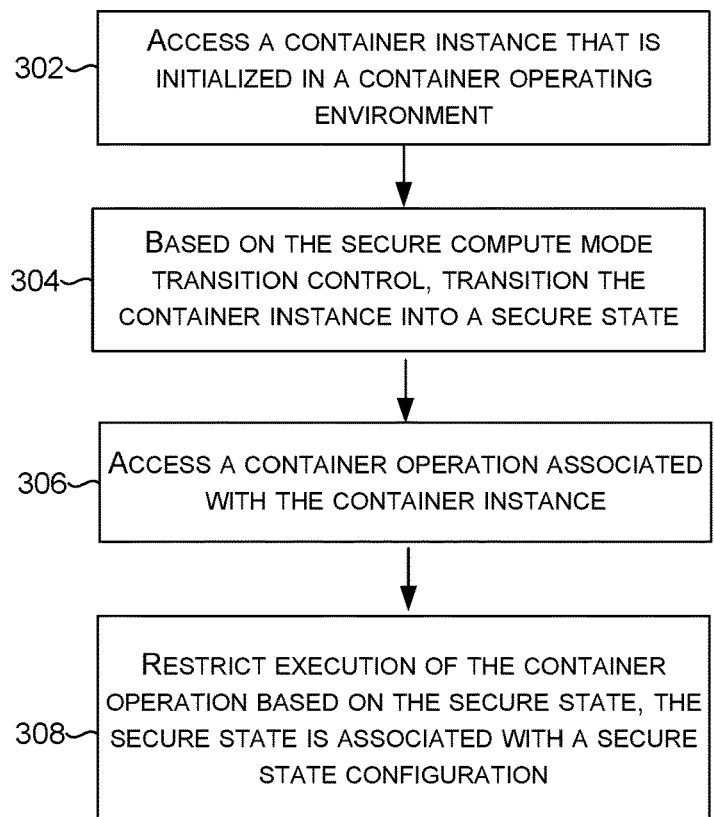

302 — ACCESS A CONTAINER INSTANCE THAT IS INITIALIZED IN A CONTAINER OPERATING ENVIRONMENT

304 — BASED ON THE SECURE COMPUTE MODE TRANSITION CONTROL, TRANSITION THE CONTAINER INSTANCE INTO A SECURE STATE

306 — ACCESS A CONTAINER OPERATION ASSOCIATED WITH THE CONTAINER INSTANCE

308 — RESTRICT EXECUTION OF THE CONTAINER OPERATION BASED ON THE SECURE STATE, THE SECURE STATE IS ASSOCIATED WITH A SECURE STATE CONFIGURATION

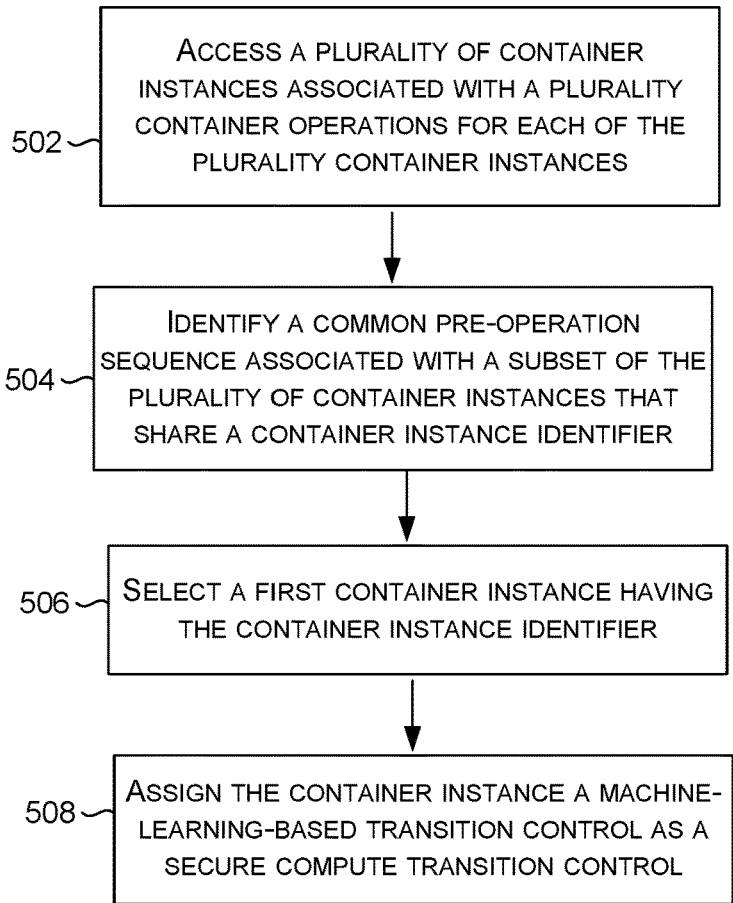

502 — ACCESS A PLURALITY OF CONTAINER INSTANCES ASSOCIATED WITH A PLURALITY CONTAINER OPERATIONS FOR EACH OF THE PLURALITY CONTAINER INSTANCES

504 — IDENTIFY A COMMON PRE-OPERATION SEQUENCE ASSOCIATED WITH A SUBSET OF THE PLURALITY OF CONTAINER INSTANCES THAT SHARE A CONTAINER INSTANCE IDENTIFIER

506 — SELECT A FIRST CONTAINER INSTANCE HAVING THE CONTAINER INSTANCE IDENTIFIER

508 — ASSIGN THE CONTAINER INSTANCE A MACHINE-LEARNING-BASED TRANSITION CONTROL AS A SECURE COMPUTE TRANSITION CONTROL

FIG. 5

CONTAINER MODE MANAGEMENT ENGINE IN A SECURITY MANAGEMENT SYSTEM

BACKGROUND

Users rely on computing environments with applications and services to accomplish computing tasks. Distributed computing systems host and support different types of applications and services in managed computing environments. In particular, computing environments can implement a security management system that provides security posture management functionality and supports threat protection in the computing environments. For example, the security management system can support container security to enable integrity, confidentiality, and availability of applications and data containers contain. The security management system can operate as a container security system to safeguard containerized applications, and the computing environment in which they run, from threats and vulnerabilities. In this way, the security management system can mitigate risks and protect against potential security breaches throughout the container lifecycle, from image creation to runtime operation.

SUMMARY

Various aspects of the technology described herein are generally directed to systems, methods, and computer storage media for, among other things, providing container secure computing modes using a container mode management engine of a security management system. A container secure computing mode can include a state (e.g., secure state) in which a container operates to prioritize security measures and practices. In particular, a container secure computing mode can be a secure state (e.g., a high-restriction mode or a policy-based-restriction) that is assigned to a container and enforced via a container security agent. The container mode management engine supports several secure compute mode transition controls that are different mechanisms that can be implemented using the container security agent to transition a container to a secure state. Based on the container operating in a secure state, operations executed by the container are restricted during runtime, after the container has programmatically transitioned into the secure state.

The container mode management engine operates to provide container security based on identifying and assigning secure compute mode transition controls (e.g., time-based control, report-based control, or machine-learning-based control) to different types of container instances—and based on employing a container security agent to transition and enforce a secure compute mode on a container instance. Container mode management engine operations are executed to support identifying the different types of container instances that can be assigned the secure compute mode transition controls. A container instance that is assigned a secure compute mode transition control can be transitioned to a secure compute mode—based on the secure compute mode transition control—via a container security agent, such that, the container instance operates in a secure state. For example, a container instance can be associated with a secure state configuration of a secure state (e.g., a high-restriction state or a policy-based-restriction state).

Conventionally, security management systems are not configured with a comprehensive computing logic and infrastructure to transition container instances in a computing environment to operate in secure compute modes. For example, the container instances are managed via container managers (e.g., KUBERNETES or DOCKER) that abstract underlying computing infrastructure and provide a higher-level control plane for managing containerized applications; however, the container managers limit the capacity to timely and efficiently configure container instances with container security configurations. In particular, a container manager may implement initialization operations that require deviating from a secure compute mode for a container instance. Thus, the secure compute mode is not applied on the container instance, and the container instead operates without adequate container security. Such container instances operate in a security management system that lacks integration with container mode management engine operations that support identifying and assigning secure compute mode transition controls and transitioning and enforcing secure compute modes on the container instances.

A technical solution—to the limitations of conventional security management systems—can include the challenge of determining and implementing secure compute mode transition controls for container instances—via a container security agent—and providing security management operations and interfaces via a container mode management engine in a security management system. As such, the security management system can be improved based on container mode management engine operations that operate to timely and efficiently configure and operate container instances in secure compute modes.

In operation, a container instance is initialized, the container instance is associated with a container security agent having a secure compute mode transition control for the container instance. The container instance is associated with container configuration operations that initialize the container instance. Based on the secure compute mode transition control (e.g., time-based control, report-based control, or machine-learning-based control) of the container instance, the container instance is transitioned into a secure state associated with a secure state configuration (e.g., high-restriction state or policy-based-restriction state). A container operation of the container instance is accessed. The execution of the container operation is restricted based on the secure state and the secure state configuration of the container instance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 1A and 1B are block diagrams of an exemplary security management system that includes a container mode management engine, in accordance with aspects of the technology described herein;

FIG. 2A is a block diagram of an exemplary security management system that includes a container mode management engine, in accordance with aspects of the technology described herein;

FIG. 3 provides a first exemplary method of providing container secure computing modes using a container mode management engine, in accordance with aspects of the technology described herein;

FIG. 5 provides a third exemplary method of providing container secure computing modes using a container mode management engine, in accordance with aspects of the technology described herein;

DETAILED DESCRIPTION

Overview

Figure 1B:
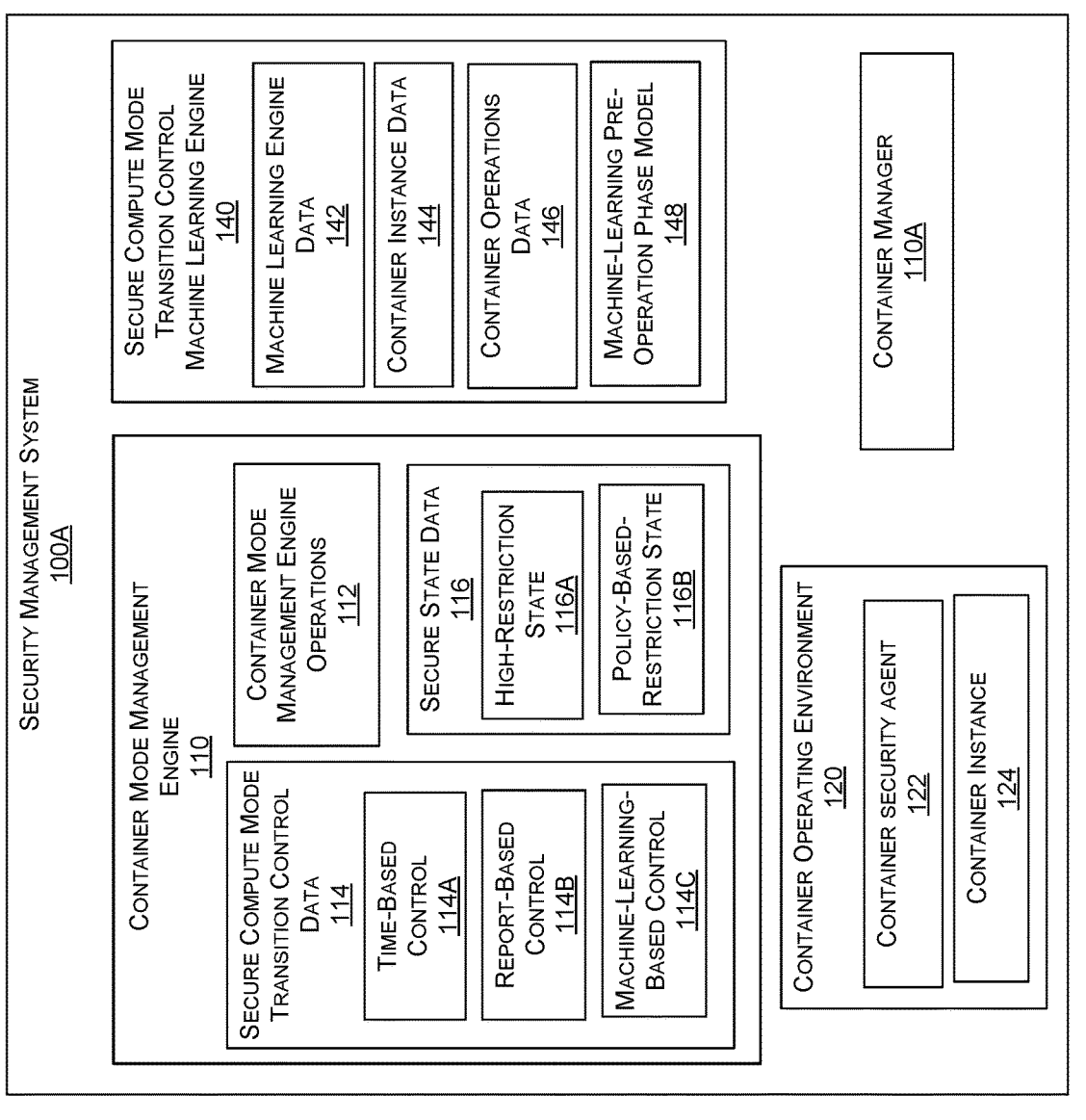

A security management system supports management of security aspects of data, resources, and workloads in computing environments. The security management system can help enable protection against threats, help reduce risk across different types of computing environments, and help strengthen a security posture of computing environments (i.e., security status and remediation action recommendations for computing resources including networks and devices). For example, the security management system can provide real-time security alerts, centralize insights for different resources, and provide for preventative protection, post-breach detection, and automated investigation, and response. The security management system can further support providing container security with security management operations that support identifying potential threats and actual threats.

The security management system can operate as a container security system to safeguard containerized applications and the computing environments in which the container instances run, from threats and vulnerabilities. A container (or container instance) is a lightweight and portable unit of software that packages an application (e.g., a single application or combination of services) and its dependencies (e.g., libraries, frameworks, and software components) together. Containers provide a consistent and isolated environment for running applications across different computing environments, such as development, testing, and production systems. Container manager (e.g., KUBERNETES or DOCKER) can refer to software responsible for running and managing containers and containers can share an operating system kernel (e.g., a host system kernel) which allows them to be lightweight and more efficient that virtual machines.

A container can be managed by a container manager that operates as a containerization platform. The container manager is responsible for initialization operations (e.g., creating, preparing, startup-running) the container instance (workload). The container manager initialization operations ("initialization phase") for creating, preparing and startup-running can include using a container image, executing a container creation operation, mounting a file system, initializing processes, assigning resources, configuring networking, setting environment variables, and performing container health checks. The container manager can further configure container security for the container when preparing the container. In this way, the container manager, by way of illustration, creates the container instance, prepares the container instance in the operating system by setting containerized environments, and starts running a workload associated with the container instance.

The container instance workload operations can be split into two phase—workload startup phase and workload operation phase. During the workload startup phase, the container can be required to perform operations that are more permissive (or less restrictive). For example, the container instance may have to read information from a host system, communicate—via a network—with one or more services to retrieve initial information needed for workload operation, open connection to external services. During the workload operation phase, the container has completed the workload startup phase and returned to the container main logic, without requiring additional information or connections to work.

Conventionally, security management systems are not configured with a comprehensive computing logic and infrastructure to transition container instances in a computing environment to operate in secure compute modes. For example, the container instances are managed via container mangers (e.g., KUBERNETES or DOCKER) that implement initialization operations and the container instance begins workload phases (i.e., workload startup phase and workload operation phase); however, the container managers limit the capacity to timely and efficiently configure container instances with secure compute modes. In particular, a container manager, which supports setting the container security, initially configures the container (i.e., prior to the workload operation phase) to be more permissive to complete initialization operations; however, during the workload operation phase, the container may need to operate with more restrictive container security. Container managers are not configured to reconfigure the container security at the workload operation phase. As such, container instances can expose a computing environment to cyberattacks if the container instances are implemented without container security restrictions or without agent-enforced container security restrictions. Such container instances operate in a security management system that lacks integration with container mode management engine operations that support identifying and assigning secure compute mode transition controls and transitioning and enforcing secure compute modes on the container instances.

Merely implementing container security using a container manager limits timeliness, control and efficiency of implementing container security. As discussed, a container manager operates to start a container instance (workload) including creating the container instance, preparing the container instance in a container operating environment, and startup-running the workload. The container instance continues with workload operations that include a workload startup phase and a workload operation phase. The container manager can further restart container instances. However, the container manager may only perform an initial container security configuration during initialization operations and fail to implement a container security configuration for the workload operation phase. As such, a more comprehensive security management system—with an alternative basis for performing security management operations—can improve computing operations and interfaces for securing management.

Embodiments of the present technical solution are directed to systems, methods, and computer storage media, for among other things, providing container secure computing modes using a container mode management engine of a security management system. A container secure computing mode can include a state (e.g., secure state) in which a container operates to prioritize security measures and practices. In particular, a container secure computing mode can be a secure state (e.g., a high-restriction mode or a policy-based-restriction) that is assigned to a container and enforced via a container security agent. The container mode management engine supports several secure compute mode transition controls that are different mechanisms that can be implemented using the container security agent to transition a container to a secure state. Based on the container operating in a secure state, operations executed by the container are restricted during runtime, after the container has programmatically transitioned into the secure state. Container secure computing modes are provided using the container mode management engine that is operationally integrated into the security management system. The security management system supports a container mode management engine framework of computing components associated with determining and implementing secure compute mode transition controls via a container security agent.

At a high level, a container mode management engine is provided to support implementing container secure computing modes for containers in a computing environment. The container mode management engine defines multiple schemes—implemented via a container security engine—for estimating and identifying when a container has changed its internal phase (e.g., to a workload operation phase) such that a security state of the container can be changed to be more restrictive and less permissible. Operationally, this allows a workload startup phase permissions that are needed to complete a first phase—workload startup phase—but also ensures that a second phase—workload operation phase—receives a minimal permission-set to protect against cyberattacks. In this way, a container secure computing mode can be assigned to a container that is associated with executing a workload, such that, the container operates in a secure state. The transition to a secure state can be a one-way transition to the secure state assigned and enforced on the container. The one-way transition can refer to the container not being able to transition back without some manual intervention or a restart of the container. In the secure state, the container operates to prioritize security measures and practices.

The secure state can be a high-restriction state or a policy-based-restriction state. The secure state of a container is enforced via a container security agent. The high-restriction state can include a secure state configuration where the container system calls are limited to a subset of permitted system calls. The subset of permitted system calls may be permitted only to existing open file descriptions. For example, the subset of permitted system calls can include exit( ), sigreturn( ), read( ), and write( ) which can be executed only against open file descriptors. A container, in high-restriction state, that attempts any other systems calls, can cause a host kernel of the container to perform a remediation action. For example, the host kernel may log the call as an event without executing the call or terminate the container call (e.g., via a SIGKILL or SIGSYS). The policy-based-restriction state can include a secure state configuration where the container is limited to a subset of permitted actions identified in a container security policy. The subset of permitted actions may be include system calls and other types of actions that can be performed by the container. For example, the policy can list allowed systems call the container can make, which files the container can execute, and which network activity is allowed via the container.

It can be technically challenging to transfer a container to a container secure computing mode because containers have to complete initialization operations and workload startup phase ("pre-operation phase") prior to transitioning to the container secure computing mode. In particular, containers associated with lift-and-shift workloads (i.e., re-hosting, wherein an exact copy of an container workload is migrated together with its data store and operating system) that are containerized to run in a computing environment in lift-and-shift workload scenarios may operate in a particularly challenging computing configuration that limits the capacity to determine the readiness of a container for a secure compute mode. As such, a container mode management engine includes secure compute mode transition controls that support transitioning a container, after completion of a pre-operation phase, into a container secure computing mode associated with a secure state. The container mode management engine may employ the container security agent to implement one or more secure compute mode transition controls on containers associated with a computing environment. The secure compute mode transition control can be the following: a time-based control, report-based control, or a machine-learning-based control.

The time-based control can be based on a timing mechanism for triggering a transition to the secure compute mode. The timing mechanism is based on a predefined time that corresponds to a predetermined time period that a container manager takes to update a container to a ready state (e.g., indicating that the container is running and healthy). As such, for some workloads, the ready state can be used as an indication that the container has completed the pre-operation phase and can transition to a container secure computing mode.

The report-based control can be based on reporting mechanism via the container security agent. For example, the container security agent can be deployed with a local direct or indirect endpoint which the container can communicate with and explicitly report that the container has completed the pre-operation phase and that the container can transition to a container secure computing mode. The direct end-point may be a network-based or inter-process communication (IPC) based endpoint, while an indirect end-point can be a file-system-based endpoint (e.g., a container workload creates file that is checked by the container security agent). It is contemplated that the report-based transition control is deterministic and reliable and can be employed based integration between the container security agent and the container workload; however, this integration may not always be possible (e.g., in a scenario where network-based communication is restricted on the network).

The machine-learning-based control can be based on an end-time of a machine-learning pre-operation phase sequence. A container instance that shares the machine-learning pre-operation phase sequence is assigned the machine-learning-based control. The machine-learning pre-operation phase sequence is generated based on a machine-learning pre-operation phase model that is trained to support identifying a common pre-operation sequence of a plurality of container instances. In particular, using machine learning or statistical approaches, the model can be trained on processes that are part of initialization operations and/or workload startup phase. For example, a container image ID and a container entry point command line can be features that can be used to support recording processes (e.g., every child process of the entry point process) and file handles opened in association with the processes. In another example, operation system calls that are executed can be used in training the machine-learning pre-operation phase model for determining the pre-operation phase and a corresponding end-time.

Based on training across different container instances, the machine-learning pre-operation phase model can be used to make an inference of what processes and file handle sequences make up a machine-learning pre-operation phase sequence. The training can further include recording a process sequence or process tree associated with initializing the container until a time period when no new processes are being spawned and comparing the sequence across multiple instances of the container to find a similarity or common sub-sequence. Another approach can be based on discovering association rules using a priori and lift algorithms to find processes and file handles which have been observed in proximity to a root process in a container. Using the approaches, machine-learning pre-operation phase sequence (e.g., a common pre-operation sequence and an end-time) can be inferred, such that, the machine-learning-based control can be employed on container instances that have the common pre-operation sequence. And the time-based control or report-based control can be employed on container instances that lack of the common pre-operation sequence.

Advantageously, the embodiments of the present technical solution include several inventive features (e.g., operations, systems, engines, and components) associated with a security management system having a container mode management engine. The container mode management engine supports determining and implementing secure compute mode transition controls for container instances—via a container security agent—and providing security management operations and interfaces via a container mode management engine in a security management system. The container mode management engine operations are a solution to a specific problem (e.g., limitations in comprehensive, timely, and efficient implementation of contain security features) in security management. The container mode management engine provides ordered combination of operations for identifying and assigning secure compute mode transition controls (e.g., time-based control, report-based control, or machine-learning-based control) to different container instances, and using a container security agent to transition and enforce a secure compute mode on a container instance. A container instance is transitioned to a secure computer mode via a container security agent such that the container instance operates in a secure state. For example, a container instance can be associated with a secure state configuration of a secure state (e.g., a high-restriction state or a policy-based-restriction state). Moreover, container instances can be assigned secure compute mode transition control based on container identifiers (e.g., pre-operation sequence) associated with the container instances.

Example Systems and Operations

Aspects of the technical solution can be described by way of examples and with reference to FIGS. 1A-1B. FIG. 1A illustrates a cloud computing system (environment) 100 including security management system 100A; network 100B; container mode management engine 110 including container mode management engine operations 112, secure compute mode transition control data 114, and secure state data 116; container manager 110A; container operating environment 120 including container security agent 122 and container instance 124; and security management client 130 including container mode management engine client 132 and container security interface data 134; and secure compute mode transition control machine learning engine.

The cloud computing environment 100 provides computing system resources for different types of managed computing environments. For example, the cloud computing environment 100 supports delivery of computing services—including servers, storage, databases, networking, and container management. A plurality of security management clients (e.g., security management client 130) include hardware or software that access resources in the cloud computing environment 100. Security management client 130 can include an application or service that supports client-side functionality associated with cloud computing environment 100. The plurality of security management clients can access computing components of the cloud computing environment 100 via a network (e.g., network 100B) to perform computing operations.

The security management system 100A is designed to provide container secure computing modes using container mode management engine 110. The security management system 100A provides an integrated operating environment based on a security management framework of computing components associated with determining and implementing secure compute mode transition controls for container instances—via a container security agent—and providing security management operations and interfaces via a container mode management engine in a security management system. The security management system 100A integrates container mode management engine operations—that support identifying the different types of container instances that can be assigned the secure compute mode transition controls—into security management operations and interfaces to effectively provide container secure computing modes. For example, a container instance that is assigned a secure compute mode transition control can be transitioned to a secure compute mode—based on the secure compute mode transition control—via a container security agent, such that, the container instance operates in a secure state.

The container mode management engine 110 is responsible for providing container secure computing modes based on container mode management engine operations 112, secure compute mode transition control data 114, and secure state data 116. The container mode management engine 110 may assign different secure compute mode transition controls (e.g., secure compute mode transition control data 114) to different container instances. In particular, the container mode management engine may identify (e.g., via secure compute mode transition control machine learning engine 140) and provide for assignment machine-learning-based control. The container mode management engine 110 can communicate with the container manager 110A that is responsible for managing and deploying container instances (e.g., container instance 124) in container operating environments (e.g., container operating environment 120).

The container mode management engine 110 may deploy and communicate with a container security agent (e.g., container security agent 122) in a container operating environment (e.g., container operating environment 120). The container mode management engine 110 may communicate a secure compute mode transition control for a container instance via the container manager 110A or the container security agent 122. The secure compute mode transition control indicates to the container security agent 122 how to transition the container instance 124 to a secure compute mode associated with secure state (e.g., secure state data). The container security agent 122 can transition the container instance 124 based on a secure compute mode transition control such that the container instance 124 operate in a secure state associated with the secure compute mode transition control. In this way, the container security agent 122 can support transitioning the different container instances based on different types of secure compute transition controls associated with the container instances.

The container instance 124 can operate in a secure state having a secure state configuration, such that, restricted container operations associated with the secure state configuration are not performed on the container instance 124. The container operating environment 120 (e.g., a host kernel) or the container security agent 122 can operate to support restricting execution of restricted container operations. The container operating environment 120 or the container security agent 122 may execute remediation actions associated with restricting execution of the restricted container operation on the container instance 124.

The security management system 100A (e.g., container mode management engine 110, container manager 110A, container operating environment 120, container security agent 122, and container instance 124) is responsible for communicating with a security management client 130 having the container mode management engine client 132 and the container security interface data 134. The container mode management engine client 132 supports client-side security management operations for providing container secure computing mode in the security management system 100. The security posture management engine client 132 supports presenting a security management system visualizations (e.g., notifications) or operational communications (e.g., administrator data) to support interacting with the different components of the security management systems. As such, the container security interface data can include communications associated with container mode management engine 110, container manager 110A, container operating environment 120, container security agent 122, and container instance 124.

With reference to FIG. 1B, FIG. 1B illustrates security management system 100A; container mode management engine 110 including container mode management engine operations 112, secure compute mode transition control data 114 including time-based control 114A, report-based control 114B, and machine-learning-based control 114C; secure state data 116 including high-restriction state 116A and policy-based-restriction state 116B; secure compute mode transition control machine learning engine 140 including machine-learning engine data 142, container instance data 144, and container operations data 146; container manager 110A; container operating environment 120 including container security agent 122 and container instance 124.

The secure compute mode transition control machine learning engine 140 is a machine learning framework or library that operates as a tool for providing infrastructure, algorithms, capabilities for designing, training, and deploying machine learning models ("collectively machine learning engine data 142"). The secure compute transition machine learning engine 140 can include pre-built functions and APIs that enable building and applying machine learning techniques. The secure compute transition machine learning engine 140 can provide a machine learning workflow from data processing and feature extraction to model training, evaluation, and deployment.

The secure compute transition machine learning engine 140 includes container instance data 144A that include attributes (e.g., identifiers, characteristics, settings, and properties) that define the behavior, configuration, and interactions of a container. The attributes determine how a container operates, communicates, and interacts with other components in the computing environment. The container instances can be associated with container operations (i.e., container operations data 146). The container operations data 146 can refer to initialization operations, workload startup phase operations, workload operation phase operations including specific configurations, settings, and actions that occur during the process of configuration the container. The container operations data 146 can include processes (e.g., child processes at entry points command lines) file handles, and operating system calls.

The secure compute transition machine learning engine 140 supports training a machine-learning pre-operation phase model 148 ("model"). The secure compute mode transition control machine learning engine 140 employs the machine learning data engine data 142, container instance data 144, and container operations data 146 to generate the model. By way of illustration, the secure compute transition machine learning engine 140 can be employed to learn what processes are part of an initialization sequence of different container instances based on initialization operations and workload startup phase ("pre-operation phase"). The model can be trained to infer, predict, or identify a pre-operation phase that is associated with a plurality of container instances based on the attributes of the container instance. Training the model can be based on attributes (e.g., image ID) and container operations data 146 (e.g., entry point command line, processes, file handles) of different types of container instances to identify initialization operations and workload startup phase and a time period when the pre-operations phase ends (e.g., when no new process is being spawned). Training the model can further include comparing pre-operation phases across multiple container instances to find similarity or common sub-sequences. Containers that share the same common pre-operation sequence—where the container is matched to the common pre-operation sequence based on a container identifier—can be assigned the machine-learning-based control.

The secure compute mode transition control data 114 includes a time-based control 114A, a report-based control 114B, and a machine-learning-based control 114C. The time-based control 114A is associated with a predefined time that indicates completion of a pre-operation phase of the container instance to trigger transitioning the container instance to the secure compute mode. The report-based control 140B is associated with explicit reporting from the container instance to the container security agent an indication of completion of a pre-operation phase of the container instance to trigger transitioning the container instance to the secure compute mode. The secure compute mode transition control 140C is a machine-learning-based control associated with an end-time of a machine-learning pre-operation phase sequence that supports providing an indication of completion of a pre-operation phase of the container instance to trigger transitioning the container to the secure compute mode. A secure compute mode transition control be assigned to a container instance via the container manager 110A, the container operating environment 120, or the container security agent 122. The secure compute mode transition control can be associated with a secure state (e.g., secure state data) for the container instance when the container instance is transitioned to a secure compute mode.

The secure state data 116 includes the high-restriction state 116A and the policy-based-restriction state 116B. The high-restriction state 116A and the policy-based-restriction state 116B are secure state configurations that can be associated with a container instance (e.g., container instance 124) when the container instance is in secure compute mode. In the high-restriction-state 116A, the container calls are limited to a subset of permitted calls, and a host kernel (not shown) or the container security agent 122 can be implemented to perform remediation actions when calls that are different from the subset of permitted calls are executed. For example, the host kernel or the container security agent 122 restrict execution of unpermitted calls (i.e., restricted container operations) when the container attempts to execute unpermitted calls. The policy-based restriction 116B can include a secure state configuration where the container is limited based on a container security policy that includes rules, guidelines, and configurations that define how the container should securely operate. For example, the container security policy may include a subset of permitted actions and unpermitted actions (e.g., restricted container operations) which can be enforced using the container security agent 122 or the host kernel.

Figure 1C:
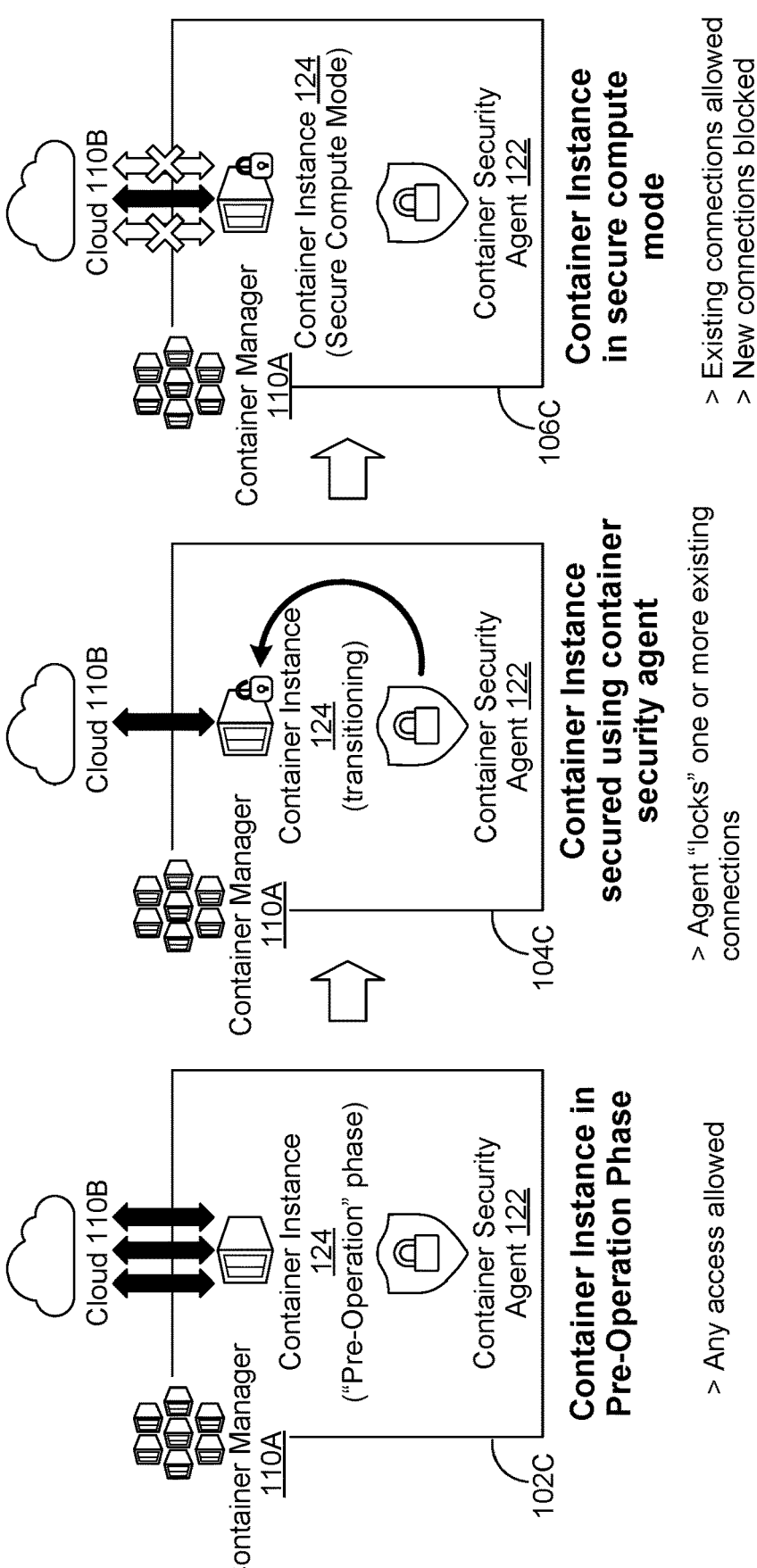
FIGS. 1C and 1D are schematics associated with an exemplary security management system that includes a container mode management engine, in accordance with aspects of the technology described herein.
Figure 1D:
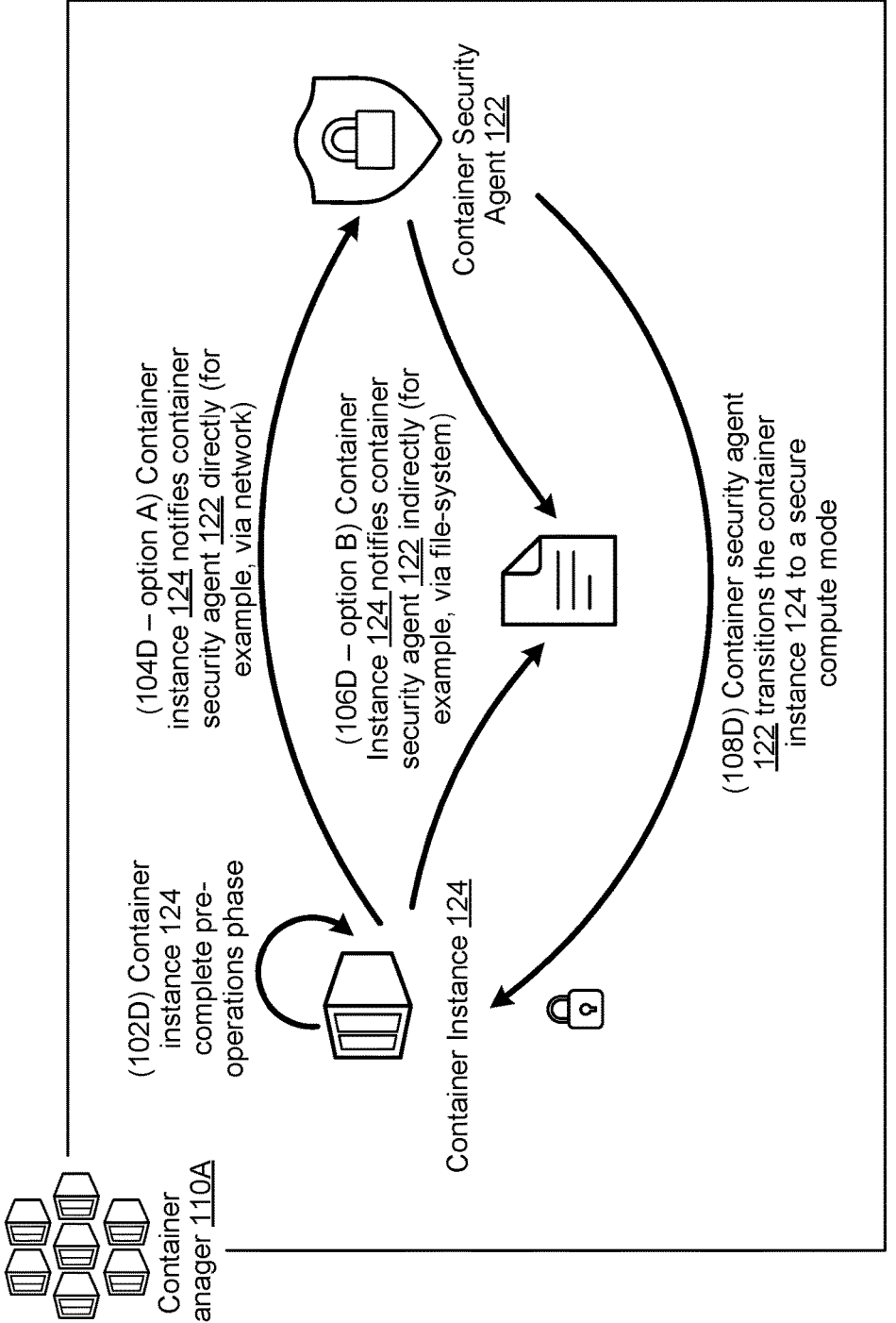

With reference to FIGS. 1C and 1D, FIGS. 1C and 1D illustrate schematics associated with the container mode management engine 110 in the security management system 100A. FIG. 1C includes container manager 110A, cloud 110B, container security agent 122, and container instance 124. At block 102C, the container instance 124 is in pre-operation phase where initialization operations and workload startup operations are performed. The initialization operations are associated with the container manager 110 that support abstracting the runtime environment associated with the container instance 124. During the workload startup operations, the container instance 124 has access to the cloud 110B (e.g., external or internal cloud networks, application, services, and resources). At block 104C, the container security agent 122 causes transitioning of the container instance 124. The container instance 124 is secured via the container security agent 122 that locks one or more existing connections to the cloud 110B. At block 106C, the container instance 124 is in secure compute mode, the container security agent 122 allows existing connections and new connections are blocked.

Turning to FIG. 1D, FIG. 1D includes container manager 110A, cloud 110B, container security agent 122, and container instance 124. At block 102D the container instance 124 is in pre-operations phase comprising initialization operations and workload startup operations. At block 104D, option A, includes container instance 124 notifying the container security agent 122 directly (e.g., via a network connection) that the container instance 122 has completed the pre-operation phase and the container instance 124 is ready to transition to a secure compute mode. At block 106D, option B, includes the container instance 124 notifying the container security agent 124 indirectly (e.g., via a file) that the container instance 122 has completed the pre-operation phase and the container instance 124 is ready to transition to a secure computer mode. At block 108D, the container security agent 122 transitions the container instance 124 to a secure compute mode.

Figure 2B:
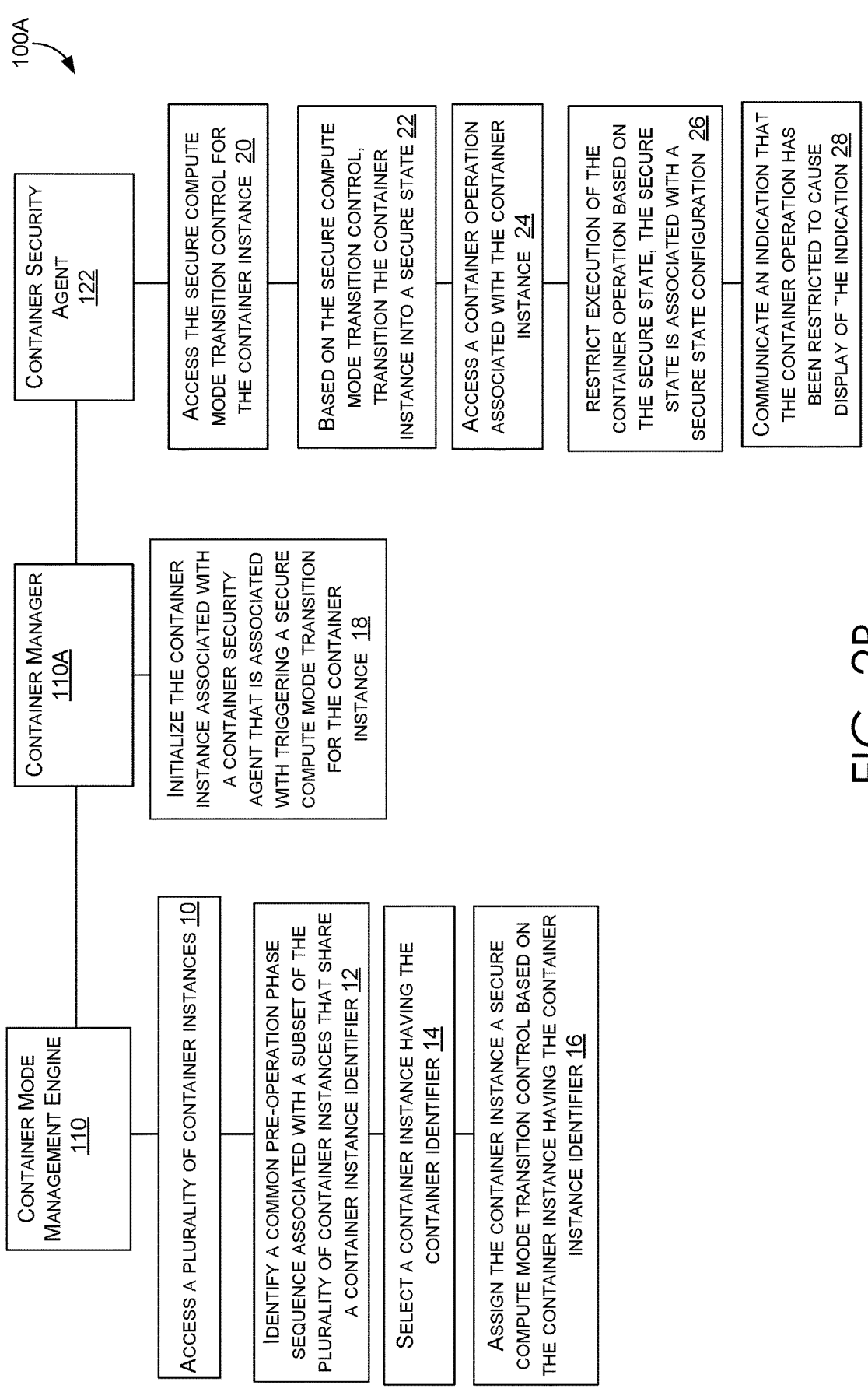
FIG. 2B is a block diagram of an exemplary security management system that includes a container mode management engine, in accordance with aspects of the technology described herein.

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example security management system 100 in which methods of the present disclosure may be employed. In particular, FIG. 2A shows a high level architecture of the security management system 100A in accordance with implementations of the present disclosure. Among other engines, managers, generators, selectors, or components not shown (collectively referred to herein as "components"), the technical solution environment of security management system 100 corresponds to FIGS. 1A and 1B.

With reference to FIG. 2A, FIG. 2A illustrates a cloud computing system (environment) 100 including security management system 100A; container mode management engine 110 including container mode management engine operations 112, secure compute mode transition control data 1114 including time-based control 114A, report-based control 114B, machine-learning-based control 114C; secure state data 116 including high-restriction state 116A, and policy-based-restriction state 116B; secure compute mode transition control data 140 including machine learning engine data 142, container operations data 144, and container instances data 146; container manager 110A; container operating environment 120 including container security agent 122 and container instance 124; and security management client 130 including container mode management engine client 132 and container security interface data 134.

The container mode management engine 110 is responsible for assigning container instance 124 a secure compute mode transition control. The secure compute mode transition control can be assigned from a plurality of secure compute mode transition controls (e.g., time-based control 114A, report-based control 114B, and machine-learning-based control 114C). The time-based control 114A is a predefined time that indicates completion of a pre-operation phase of the container instance to trigger transitioning the container instance to the secure compute mode; the report-based control 114B is associated with explicit reporting from the container instance to the container security agent an indication of completion of a pre-operation phase of the container instance to trigger transitioning the container instance to the secure compute mode; and the machine-learning-based control 114C is associated with an end-time of a machine-learning pre-operation phase sequence that supports providing an indication of completion of a pre-operation phase of the container instance to trigger transitioning the container to the secure compute mode.

The container mode management engine 110 employs secure compute mode control machine learning engine 140, via the machine-learning pre-operation phase model 148 ("model"), to identify container instances that should be assigned the machine-learning-based control 114C. In operation, the container mode management engine 110 accesses a plurality of container instances associated with a plurality of container operations for each of the plurality of container instances. The container mode management engine 110 identifies a common pre-operation sequence associated with a subset of the plurality of container instances. The subset of the plurality of container instances share a container identifier. A container identifier can be associated with one or more attributes of a container instance. The one or more attributes may uniquely identify a set of container instances. Identifying the common pre-operation sequence is based on the machine-learning pre-operation phase model that is trained to identify the common pre-operation sequence associated with the plurality of container operations. The machine-learning pre-operation phase model 148 is trained on features of the plurality of container operations, the feature include an entry point command line, a process, an open file handle, and an end-time of the pre-operation phase.

The container mode management engine 110 selects a first container instance having the container identifier. Based on the first container instance having the container identifier, the container mode management engine 110 assigns the container instance 124 a machine-learning-based control as a secure compute transition control. The container mode management engine 110 further selects a second container instance that does not have the container identifier; and based on the container instance not having the container identifier, the container instance is assigned a time-based control or a report-based control as a corresponding secure compute mode transition control.

The container manager 110A is responsible for initializing container instances (e.g., container instance 124) in a container operating environment. The container instance 124 is associated with initialization operations that initialize the container instance 124 using runtime environment abstraction. While the container manager may apply a container manager secure state, which allows the container to perform workload startup operations; the container manager secure state is not as secure as the secure state associated with the secure state data 116. The container manager 110 performs initialization operations prior to the container instance performing a workload startup phase and a workload operations phase. The container mode management engine 110 operates to identify the pre-operation phase that includes the initialization operations and the workload startup phase prior to the workload operations phase to strategically transition a container instance into secure compute mode.

The container instance 124 is associated with a container security agent (e.g., container security agent 122) having a secure compute mode transition control for the container instance 124. The container security agent can be deployed in a container operating environment and operates to execute the secure compute mode transition control associated with the container instance 124 and enforce restrictions associated with the secure state configuration of the secure state associated with container instance 124. The secure state configuration can include a high-restriction state associated with a subset of permitted system call; or a policy-based-restriction state associated with a subset of permitted actions identified in a container security policy.

The container security agent 124 accesses the container instance 124 that is initialized in the container operating environment 120. Based on the secure compute mode transition control of the container instance 124, the container security agent 124 transitions the container instance into a secure state. The secure state can be associated with a secure state configuration (e.g., high-restriction state 116A or policy-based-restriction state 116B). The container security agent 122 can access a container security operation associated with container instance 124. The container operation can be a restricted container operation. The container security agent 122 restricts execution of the container operation based on the secure state and the secure state configuration.

With reference to FIG. 2B, FIG. 2B illustrates a security management system 100A having container mode management engine 110, container manager 110A, and container security agent 122. At block 10, the container mode management engine 110 accesses a plurality of container instances; at block 12, identifies a common pre-operation sequence associated with a subset of the plurality of container instances that share a container instance identifier; at block 14, selects a container instance having the container identifier; and at block 16, assigns the container instance a secure compute mode transition control based on the container instance having the container instance identifier. At block 18, the container manager 110A initializes the container instance associated with a container security agent that is associated with triggering a secure compute mode transition for the container instance. At block 20, the container security agent accesses the secure compute mode transition control for the container instance; at block 22, based on the secure compute mode transition control, transitions the container instance into a secure state; at block 24, accesses a container operation associated with container instance; at block 26, restricts the execution of the container operation based on the secure state, the secure state is associated with a secure state configuration; and at block 28, communicates an indication that the container operation has been restricted to cause display of the indication.

Example Methods

Figure 4:
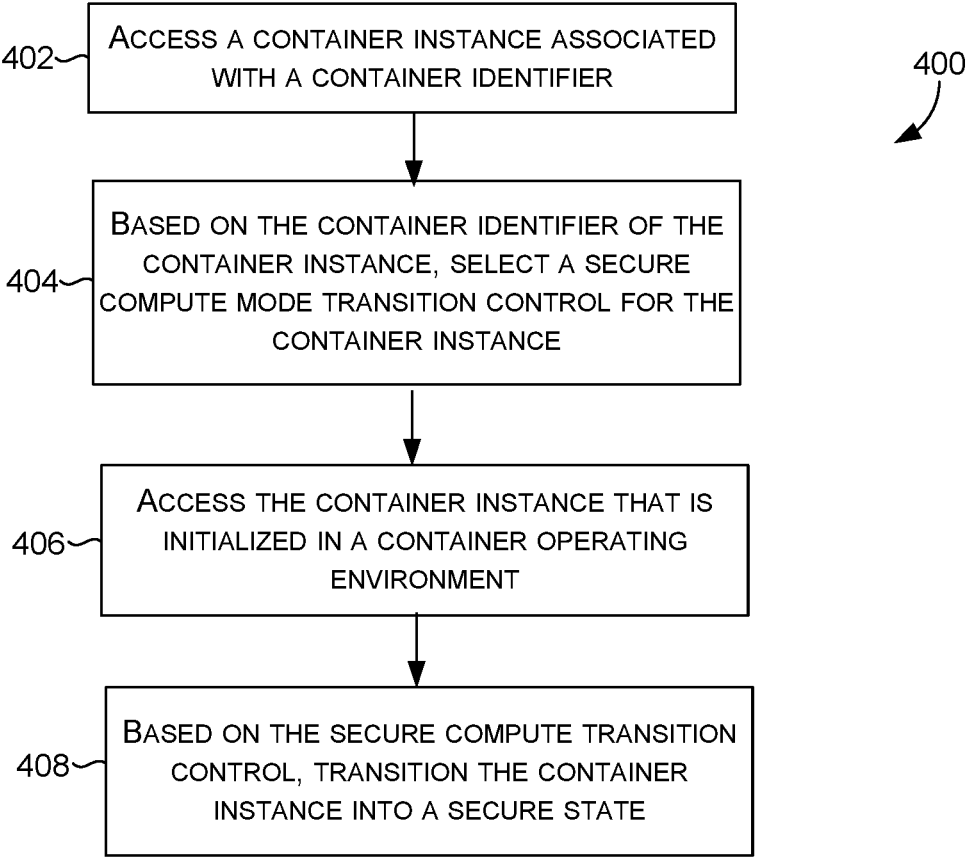
FIG. 4 provides a second exemplary method of providing container secure computing modes using a container mode management engine, in accordance with aspects of the technology described herein.

With reference to FIGS. 3, 4, and 5, flow diagrams are provided illustrating methods for providing container secure computing modes using a container mode management engine in a security management system. The methods may be performed using the security management system described herein. In embodiments, one or more computer-storage media having computer-executable or computer-useable instructions embodied thereon that, when executed, by one or more processors can cause the one or more processors to perform the methods (e.g., computer-implemented method) in the security management system (e.g., a computerized system or computing system).

Turning to FIG. 3, a flow diagram is provided that illustrates a method 300 for providing container secure computing modes using a container mode management engine in a security management system. At block 302, a container instance is initialized. The container instance is associated with a container security agent having a secure compute mode transition control for the container instance. At block 304, based on the secure compute mode transition control, the container instance is transitioned into a secure state. At block 308, a container operation associated with the container instance is accessed. At block 310, the execution of the container operation is restricted based on the secure state. The secure state is associated with a secure state configuration.

Turning to FIG. 4, a flow diagram is provided that illustrates a method 400 for providing container secure computing modes using a container mode management engine in a security management system. At block 402, the container instance associated with container identifier is accessed. At block 404, based on the container identifier of the container instance, a secure compute mode transition control for the container instance is selected. At block 406, the container instance is initialized. A container instance is associated with a container security agent associated with triggering a secure compute mode transition for the container instance. At block 408, based on the secure compute transition control, the container instance is transitioned into a secure state.

Turning to FIG. 5, a flow diagram is provided that illustrates a method 500 for providing container secure computing modes using a container mode management engine in a security management system. At block 502, a plurality of container instances is accessed. At block 504, a common pre-operation sequence associated with a subset of the plurality of container instances that share a container instance identifier is identified. At block 506, a container instance having the container instance identifier is selected. At block 508, the container instance is assigned a secure compute mode based on the container instance having the container instance identifier.

Technical Improvement

Embodiments of the present technical solution have been described with reference to several inventive features (e.g., operations, systems, engines, and components) associated with a security management system. Inventive features described include: operations, interfaces, data structures, and arrangements of computing resources associated with providing the functionality described herein relative with reference to a container mode management engine. Functionality of the embodiments of the present technical solution have further been described, by way of an implementation and anecdotal examples—to demonstrate that the operations (e.g., determining and implementing secure compute mode transition controls for container instances—via a container security agent based on container mode management engine operations) for providing the container mode management engine. The container mode management engine is as a solution to a specific problem (e.g., limitations in comprehensive, timely, and efficient implementation of contain security features) in security management technology. The container mode management engine improves computing operations associated with identifying and assigning secure compute mode transition controls (e.g., time-based control, report-based control, or machine-learning-based control) to different container instances, and using a container security agent to transition and enforce a secure compute mode on a container instance. Overall, these improvements result in less CPU computation, smaller memory requirements, and increased flexibility in security management systems when compared to previous conventional security management system operations performed for similar functionality.

ADDITIONAL SUPPORT FOR DETAILED DESCRIPTION

Example Distributed Computing System Environment

Figure 6:
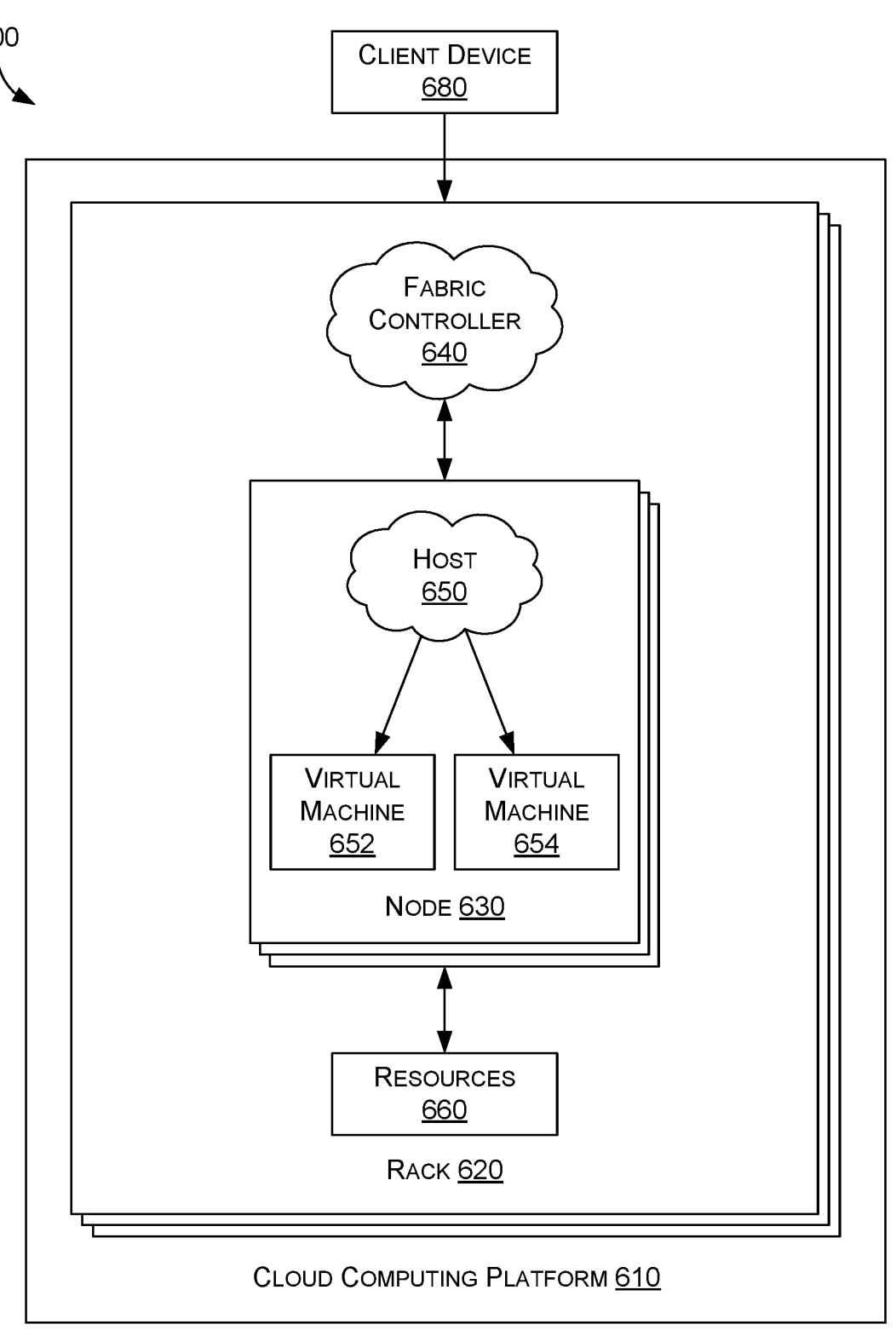
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Having briefly described an overview of embodiments of the present technical solution, an example operating environment in which embodiments of the present technical solution may be implemented is described below in order to provide a general context for various aspects of the present technical solution. Referring initially to FIG. 6 in particular, an example operating environment for implementing embodiments of the present technical solution is shown and designated generally as computing device 600. Computing device 600 is but one example of a suitable computing environment and is not intended to suggest any limitation as to the scope of use or functionality of the technical solution. Neither should computing device 700 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

Figure 7:
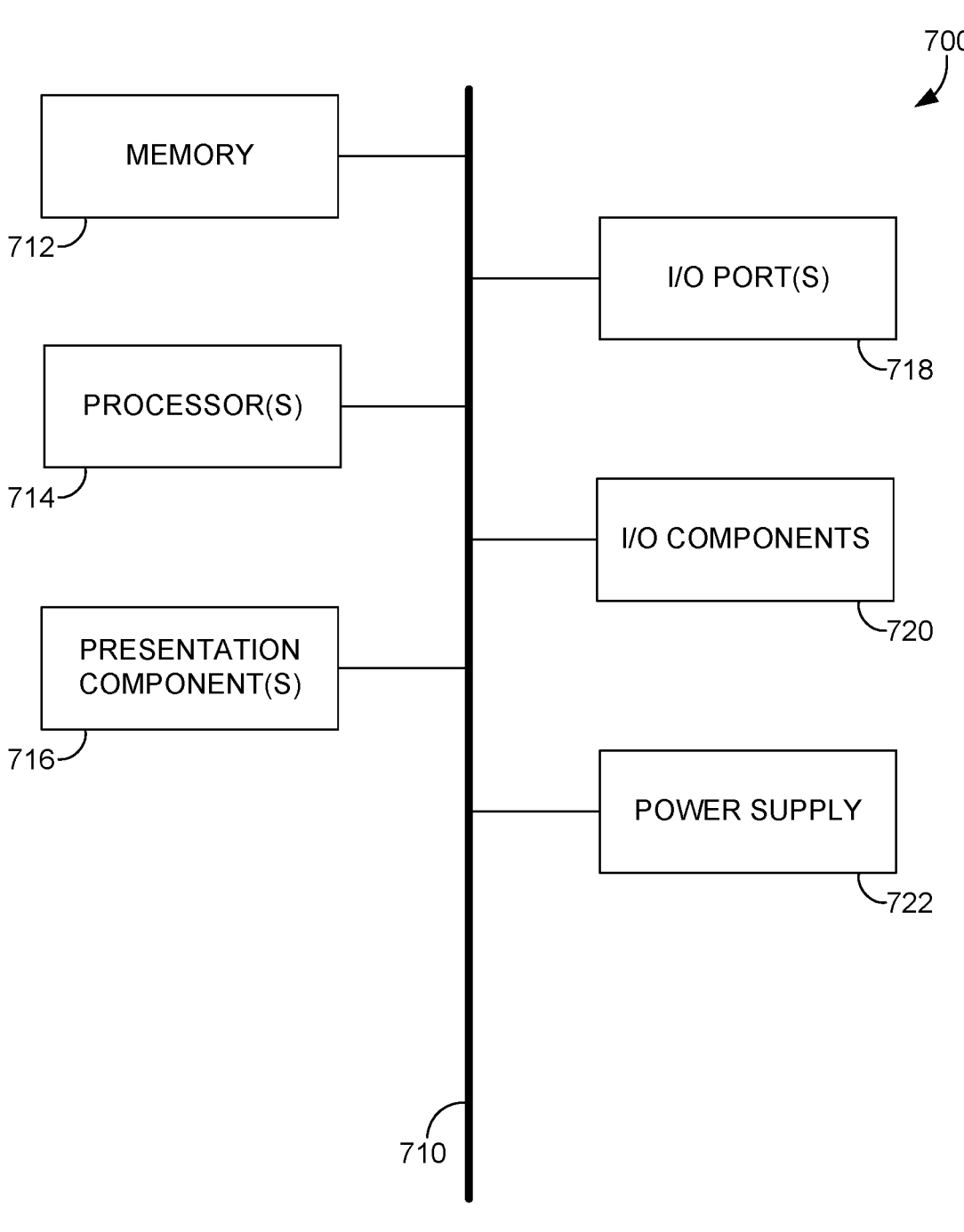
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present technical solution. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations, the operations comprising:
accessing a container instance, wherein the container instance is initialized in a container operating environment, the container instance is associated with a container security agent having a secure compute mode transition control for the container instance, wherein the container security agent supports restricting the container instance from executing restricted container operations during runtime;

based on the secure compute mode transition control, transitioning the container instance into a secure state, wherein the secure state is associated with a secure state configuration;
accessing a container operation associated with the container instance, wherein the container operation is a restricted container operation; and
restricting execution of the container operation during runtime based on the container instance operating in the secure state and the secure state configuration.

2. The system of claim 1, the system further comprising a container manager that initializes the container instance in the container operating environment using initialization operations and the container instance is associated with a workload startup phase and a workload operations phase.

3. The system of claim 1, wherein the container security agent is deployed in the container operating environment and operates to execute the secure compute mode transition control associated with the container instance and enforce restrictions associated with the secure state configuration of the secure state associated with the container instance.

4. The system of claim 1, wherein the secure compute mode transition control is a time-based control comprising a predefined time that indicates completion of a pre-operation phase of the container instance to trigger transitioning the container instance to the secure compute mode.

5. The system of claim 1, wherein the secure compute mode transition control is a report-based control associated with explicit reporting from the container instance to the container security agent an indication of completion of a pre-operation phase of the container instance to trigger transitioning the container instance to the secure compute mode.

6. The system of claim 1, wherein the secure compute mode transition control is a machine-learning-based control associated with an end-time of a machine-learning pre-operation phase sequence that supports providing an indication of completion of a pre-operation phase of the container instance to trigger transitioning the container to the secure compute mode.

7. The system of claim 1, wherein the secure compute mode transition control is selected from a plurality of secure compute mode transition controls comprising a time-based control, a report-based control, and a machine-learning-based control, the plurality of secure compute mode transition controls are associated with a pre-operation phase comprising an initialization phase and a workload startup phase.

8. The system of claim 1, wherein the secure state configuration comprises a high-restriction state associated with a subset of permitted system calls.

9. The system of claim 1, wherein the secure state configuration a policy-based-restriction state associated with a subset of permitted actions identified in a container security policy.

10. The system of claim 1, wherein restricting execution of the container operation comprises causing a host kernel to perform a remediation action upon detecting an attempt to execute the restricted container operation.

11. One or more computer-storage media having computer-executable instructions embodied thereon that, when executed by a computing system having a processor and memory, cause the processor to perform operations, the operations comprising:
accessing a container instance, wherein the container instance a container identifier;

based on the container identifier of the container instance, selecting a secure compute mode transition control for the container instance;

accessing the container instance, wherein the container instance is initialized in a container operating environment, the container instance is associated with a container security agent having a secure compute mode transition control for the container instance, wherein the container security agent supports restricting the container instance from executing restricted container operations during runtime;

based on the secure compute mode transition control, transitioning the container instance into a secure state, wherein the secure state is associated with a secure state configuration.

12. The media of claim 11, wherein the container identifier is associated with one or more attributes of the container instance that identify a set of container instances as having a common pre-operation sequence.

13. The media of claim 11, wherein a container manager initializes the container instance in the container operating environment using initialization operations and the container instance is associated with a workload startup phase and a workload operations phase.

14. The media of claim 11, wherein the container security agent operates to execute the secure compute mode transition control associated with the container instance and enforce restrictions associated with the secure state configuration of the secure state associated with the container instance.

15. The media of claim 11, wherein the secure compute mode transition control is selected from a plurality of secure compute mode transition controls comprising a time-based control, a report-based control, and a machine-learning-based control, the plurality of secure compute mode transition controls are associated with a pre-operation phase comprising an initialization phase and a workload startup phase.

16. A computer-implemented method, the method comprising:

accessing a plurality of container instances associated with a plurality of container operations for each of the plurality of container instances;

identifying a common pre-operation sequence associated with a subset of the plurality of container instances, wherein the subset of the plurality of container instances share a container identifier;

selecting a first container instance having the container identifier; and based on the container instance having the container identifier, assigning the container instance a machine-learning-based control as a secure compute transition control.

17. The method of claim 16, wherein identifying the common pre-operation sequence is based on a machine-learning pre-operation phase model that is trained to identify the common pre-operation sequence associated with the plurality of operations.

18. The method of claim 17, wherein the machine-learning pre-operation phase model is trained on features of the plurality of container operations, the features comprising two or more of the following: an entry point command line, a process, an open file handle, and an end-time of a pre-operation phase.

19. The method of claim 16, the method further comprising:

selecting a second container instance that does not have the container identifier; and based on the container instance not having the container identifier, assigning the container instance a time-based control or a report-based control as a corresponding secure compute mode transition control.

20. The method of claim 16, the method further comprising:

accessing the container instance, wherein the container instance is initialized in a container operating environment, the container instance is associated with a container security agent associated with the secure compute mode transition control for the container instance; and based on the secure compute mode transition control, transitioning the container instance into a secure state, wherein the secure state is associated with a secure state configuration.

* * * * *